(12) United States Patent
Almehio

(10) Patent No.: US 12,361,595 B2
(45) Date of Patent: Jul. 15, 2025

(54) METHOD FOR MANAGING IMAGE DATA AND AUTOMOTIVE LIGHTING DEVICE

(71) Applicant: VALEO VISION, Bobigny (FR)

(72) Inventor: Yasser Almehio, Bobigny (FR)

(73) Assignee: VALEO VISION, Bobigny (FR)

( * ) Notice: Subject to any disclaimer, the term of this patent is extended or adjusted under 35 U.S.C. 154(b) by 498 days.

(21) Appl. No.: 17/783,137

(22) PCT Filed: Dec. 1, 2020

(86) PCT No.: PCT/EP2020/084182
§ 371 (c)(1),
(2) Date: Jun. 7, 2022

(87) PCT Pub. No.: WO2021/115853
PCT Pub. Date: Jun. 17, 2021

(65) Prior Publication Data
US 2023/0020867 A1    Jan. 19, 2023

(30) Foreign Application Priority Data
Dec. 13, 2019  (FR) ...................... 19 14423

(51) Int. Cl.
*G06T 9/00*  (2006.01)
*F21S 41/153*  (2018.01)
*F21S 41/663*  (2018.01)
*G06T 7/136*  (2017.01)
*H04N 19/59*  (2014.01)

(52) U.S. Cl.
CPC .............. *G06T 9/00* (2013.01); *F21S 41/153* (2018.01); *F21S 41/663* (2018.01); *G06T 7/136* (2017.01)

(58) Field of Classification Search
CPC ....... F21S 41/153; F21S 41/663; G06T 7/136; G06T 9/00; H04N 19/59
See application file for complete search history.

(56) References Cited

U.S. PATENT DOCUMENTS 5,327,254 A * 7/1994 Daher ................... H04N 19/59
382/298
6,654,713 B1 * 11/2003 Rethman ............... G06F 30/367
703/2

(Continued)

FOREIGN PATENT DOCUMENTS

| CA | 3030684 C * | 9/2023 | ............. G06F 18/22 |
| CN | 109668115 A | 4/2019 | |

(Continued)

OTHER PUBLICATIONS

Japanese Office Action issued on Jun. 30, 2023 in Japanese Patent Application No. 2022-535734 (with English translation), 6 pages.

(Continued)

*Primary Examiner* — Asghar H Bilgrami
(74) *Attorney, Agent, or Firm* — Oblon, McClelland, Maier & Neustadt, L.L.P.

(57) ABSTRACT

A method for managing image data in an automotive lighting device. This method includes the steps of providing an image pattern, dividing the image pattern in rows or columns of pixels, and providing, for each row pattern, a plurality of linear segments. Also included is providing a breaking pixel, splitting a segment by the breaking pixel, compressing the data of the linear segments and sending the compressed data to the light module. The invention also provides an automotive lighting device for performing the steps of such a method.

20 Claims, 5 Drawing Sheets

(56) References Cited

U.S. PATENT DOCUMENTS

| | | | |
|---|---|---|---|
| 7,349,574 B1 * | 3/2008 | Sodini | H04N 23/71 348/E5.037 |
| 2004/0143380 A1 | 7/2004 | Stam et al. | |
| 2016/0332560 A1 | 11/2016 | Nakatani | |
| 2017/0141847 A1 | 5/2017 | De Bruijn | |
| 2017/0225609 A1 | 8/2017 | Tsuzuki | |
| 2019/0197934 A1 | 6/2019 | El Idrissi et al. | |
| 2019/0320890 A1 * | 10/2019 | Tahara | G06V 10/443 |
| 2020/0108766 A1 | 4/2020 | Shibata | |

FOREIGN PATENT DOCUMENTS

| | | | | |
|---|---|---|---|---|
| DE | 10 2016 014 330 B3 | | 4/2018 | |
| JP | 2006-511383 A | | 4/2006 | |
| JP | 2011-253222 A | | 12/2011 | |
| JP | 2016-215692 A | | 12/2016 | |
| JP | 2017-140947 A | | 8/2017 | |
| TW | 1223228 B | * | 3/2003 | G09G 3/3648 |
| WO | WO-2004034183 A2 | * | 4/2004 | B60Q 1/085 |
| WO | WO-2015193042 A1 | * | 12/2015 | H04B 10/116 |
| WO | WO-2016014330 A1 | * | 1/2016 | A61N 1/3621 |
| WO | WO 2018/225710 A1 | | 12/2018 | |

OTHER PUBLICATIONS

International Search Report & Written Opinion issued Feb. 17, 2021 in PCT/EP2020/084182 filed on Dec. 1, 2020, 14 pages.

Chinese Office Action issued Feb. 2, 2024 in Chinese Patent Application No. 202080085483.3, 13 pages.

* cited by examiner

[Fig. 1]

METHOD FOR MANAGING IMAGE DATA AND AUTOMOTIVE LIGHTING DEVICE

This invention is related to the field of automotive lighting devices, and more particularly, to the management of the electronic data derived from the control of the lighting sources.

Current lighting devices comprises an increasing number of light sources which has to be controlled, to provide adaptive lighting functionalities.

This number of light sources involves a big amount of data, which has to be managed by the control unit. The CAN protocol is often used, in some of their variants (CAN-FD is one of the most used ones) to transfer data between the PCM and the light module. However, some car manufacturers decide to limit the bandwidth of the CAN protocol, and this affects the management operations, which usually requires about 5 Mbps.

Current compression methods are not very efficient for high beam patterns, and this compromises the bandwidth reduction which is requested by car manufacturers.

This problem is even worse with the modern high resolution modules, where the information amount is much higher, while the limit in the bandwidth does not increase.

A solution for this problem is sought.

The invention provides a solution for these problems by means of a method for managing image data in an automotive lighting device, the method comprising the steps of
- providing an image pattern comprising a plurality of pixels, wherein each pixel is characterized by a numeric value related to the luminous intensity of the pixel;
- dividing the image pattern in rows or columns of pixels, thus creating a plurality of row patterns;
- providing, for each row pattern, a plurality of linear segments, each linear segment providing a linear approximation to a group of pixels;
- providing, for each row pattern, at least one breaking pixel,
- locating the segment comprising the breaking pixel, this segment comprising a start pixel and an end pixel;
- splitting the segment into two segments: a first segment from the start pixel to the breaking pixel and another segment from the pixel adjacent to the breaking pixel to the end pixel;
- compress the data of the linear segments; and
- send the compressed data to the light module.

This method is aimed to manage the image data which is exchanged between a control unit and a light module. The control unit is in charge of calculating the image pattern and the compression data, and may be located in any position of the automotive vehicle, not necessarily physically inside the lighting device. The lighting module is aimed to provide a light pattern, either for lighting or signalling, and is located inside the lighting device.

The main advantage of this method is the error control, due to the fact that when a high compression rate method is chosen, the error may be too high to be acceptable. Breaking pixels are chosen in strategic points where the error may be higher, to increase the number of segments in this zone and then reduce the error.

In some particular embodiments, the light pixels of the image pattern are grey scale pixels, and more particularly, the luminous intensity of each pixel is according to a scale from 0 to 255.

Light modules usually define the light pattern on a grey scale, where the luminous intensity is graded from 0 to 255. This is a way of quantifying the light pattern so that it becomes able to be converted into light data, and then transmitted and managed by the control unit of the vehicle.

In some particular embodiments, the step of providing breaking pixels comprises providing more than one breaking pixel for each row pattern.

The more breaking pixels are provided, the more the error will be reduced, at a cost of also decreasing the compression rate. The number of breaking pixels should therefore be chosen carefully.

In some particular embodiments, the breaking pixel is located in a segment where the numeric values are higher than a first threshold value. In some particular embodiments, the breaking pixel is located in a segment wherein the difference between the numeric value of a pixel and the numeric value of the adjacent pixel is greater than a second threshold value. In some particular embodiments, the breaking pixel is located in a segment where the difference between the original numeric values and the linear approximation is higher than a third threshold value.

The location of the breaking pixels is strategically defined. The higher values of luminous intensity need a more accurate approximation, and this is one reason why the breaking pixels should be placed in these locations. Another criterion refers to the gradient between two adjacent pixels, since a high gradient would need more accuracy to reduce the errors. Even, a more direct criterion is related to the error between the original set of data and the linear approximation. Any of these criteria or any other suitable one would be used in the choice of the location of the breaking pixel.

In some particular embodiments, the method further comprises the step of decompressing the compressed data.

This step is convenient when the original image is to be projected by the light module.

In some particular embodiments, the compressed data is related only to a particular portion of the image pattern.

This cropping step is useful when a big portion of the image is completely dark, so that the compression stage is focused only on the portion which include representative values.

In a second inventive aspect, the invention provides a lighting device comprising
- a light module comprising a plurality of light sources; and
- a control unit to carry out the steps of a method according to the first inventive aspect.

This lighting device is able to operate with a lower bandwidth than the traditional ones.

In some particular embodiments, the light module further comprises a processor unit, the processor unit being configured to decompress the compressed data.

With a decompression stage in the proper light module, the bandwidth is narrowed until the module itself.

In some particular embodiments, the light sources are solid-state light sources, such as LEDs.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the life span of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures.

Figure 1:
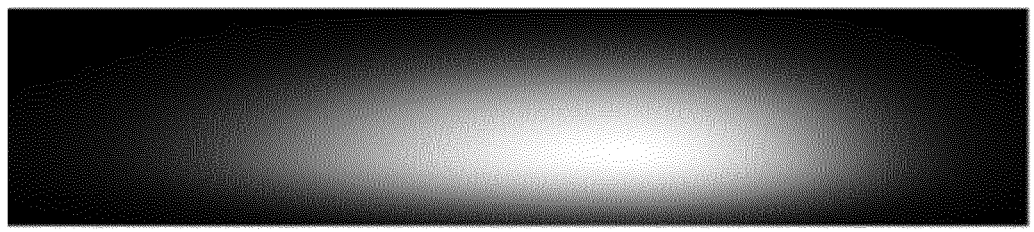
FIG. 1 shows a first image of the photometry of a high beam module which is projected by an automotive lighting device according to the invention.

In these figures, the following reference numbers have been used:
1 Image pattern
2 Row pattern
3 Pixel of the image pattern
4 Light module
5 LEDs
6 Control unit
7 Processor unit
8 Graphic of the original values
9 Linear segments
10 Automotive lighting device
11 Breaking pixel
100 Automotive vehicle The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

[FIG. 1] shows a first image of the photometry of a high beam module which is to be projected by an automotive lighting device according to the invention.

This first image may be divided into pixels and each pixel may be characterized by its luminous intensity, in a scale from 0, which would correspond to black, to 255, which would correspond to white.

Figure 2:
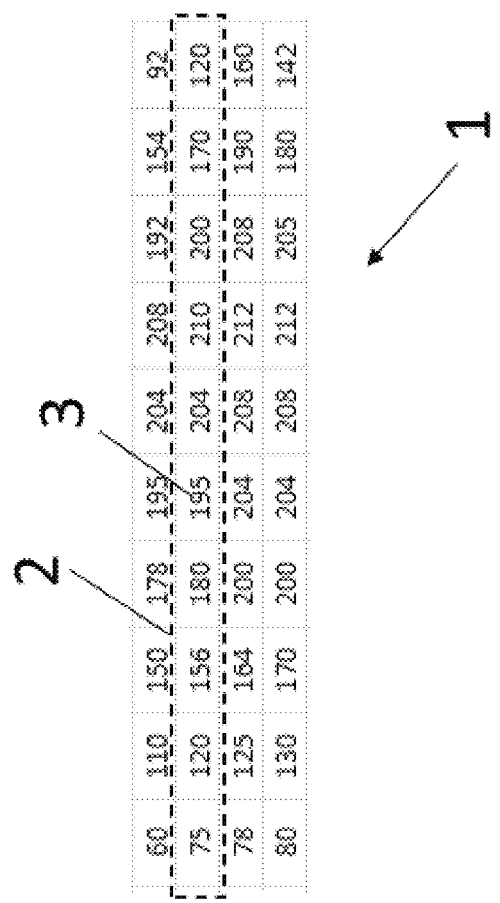
FIG. 2 shows a portion of a pixel matrix representing the photometry of [FIG. 1].

[FIG. 2] shows a portion of such a pixel matrix, called image pattern 1. Each pixel 3 of this image pattern 1 is characterized by a number according to the aforementioned scale. The compression of this image pattern 1 according to commercially available software products would offer a compression rate lower than 50%, which is unacceptable by some car manufacturers.

In this image, the pixels are divided into row patterns 2. Each pattern comprises a string of data, with numeric values between 0 and 255, depending on the luminous intensity of the associated pixels.

For the sake of the understanding of the invention, these numeric values are a mere example, and do not correspond to the luminous intensity of the photometry of [FIG. 1].

Figure 3:
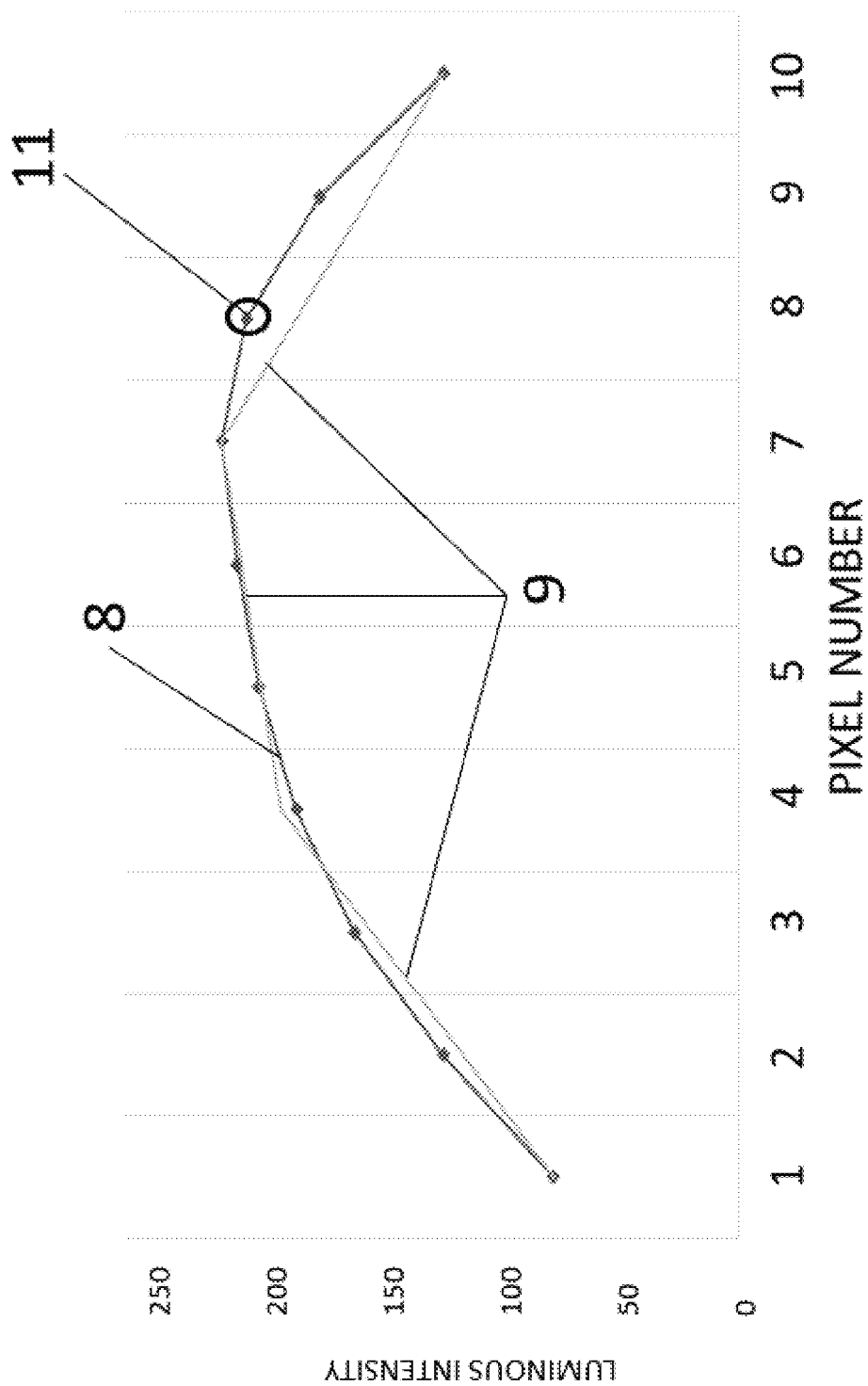
FIG. 3 shows a graphic representation of row patterns of a method according to the invention.

[FIG. 3] shows a graphic representation 8 of one of these row patterns. The horizontal axis represents the pixel number and the vertical axis represent the luminous intensity, in the scale from 0 to 255. Further, there are linear segments 9 which try to provide an approximation to different groups of pixels.

A first segment would cover the data of pixels 1 to 4, and would be a linear approximation from 75 to 186. A second segment would cover the data from pixels 4 to 7, and would be a linear approximation from 186 to 210. The third one would cover the data of pixels 7 to 10, and would be a linear approximation between 210 and 120.

The original data 8 of the pixels is replaced by the data of the linear segments 9 and would be sent to the light module, thus involving a considerable data saving with respect to the original set of data.

However, while the first and second segments fit well to the original data, the error in the third segment is particularly high. Hence, a breaking pixel is defined in this interval.

Figure 4:
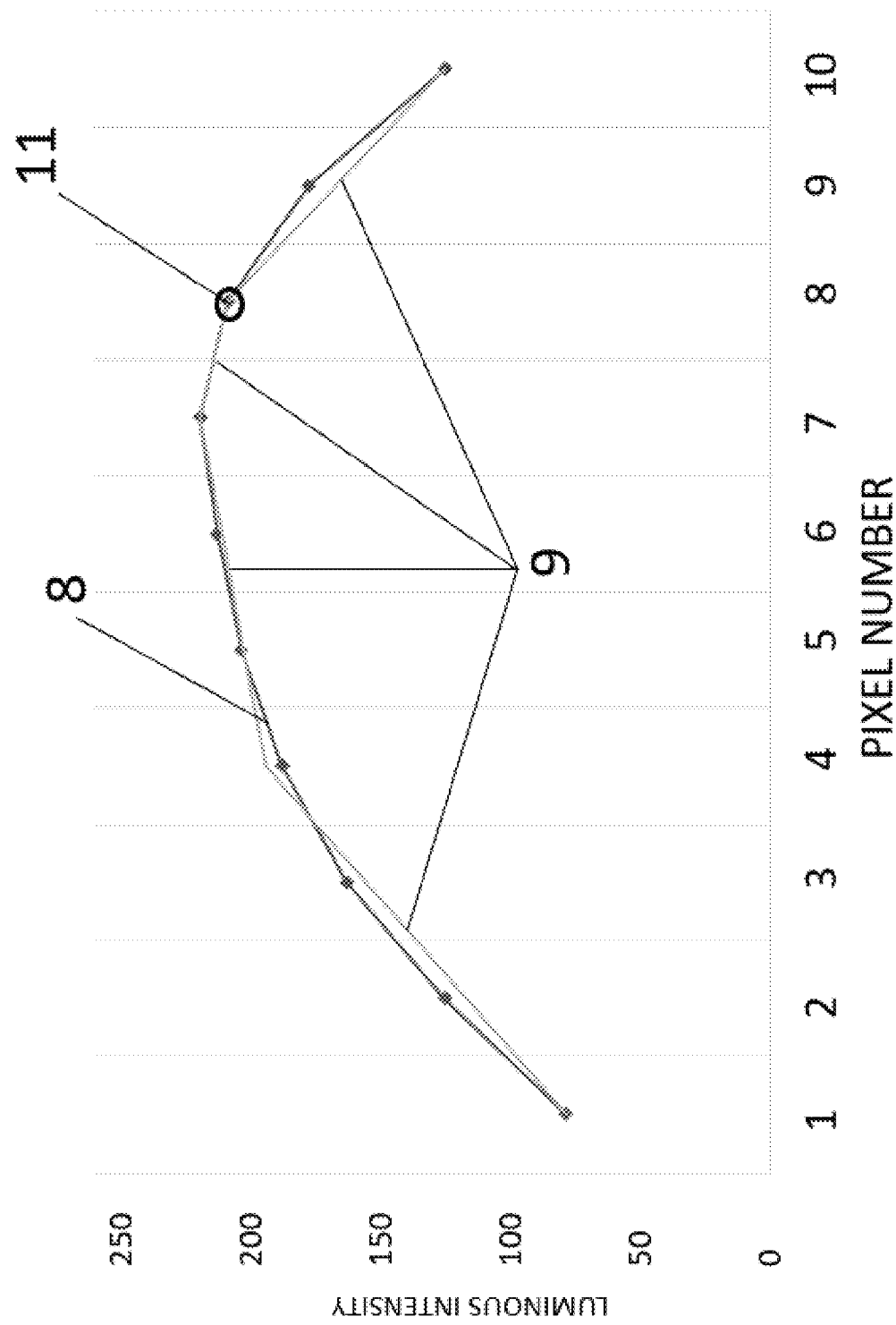
FIG. 4 shows a particular example of an error map of an image pattern which has followed a method according to the invention.

[FIG. 4] shows the result of applying a correction method according to the invention. Segment which goes from the pixel number 7 to the pixel number 10 provides a high error, so pixel number 8 has been chosen as the breaking pixel, because it provides a gradient much higher than the previous pixel: the gradient in pixel 7 is 10 while the gradient in pixel 8 is 30. Further, the difference between the original luminous intensity in pixel 8 and its linear approximation is 20. As a consequence, the original segment from pixel number 7 to pixel number 10 is split into two new segments: one from pixel number 7 to pixel number 8 and the other one from pixel number 8 to pixel number 10.

The result is much more accurate than the graphic shown in [FIG. 4], due to the presence of the breaking pixel.

Figure 5:
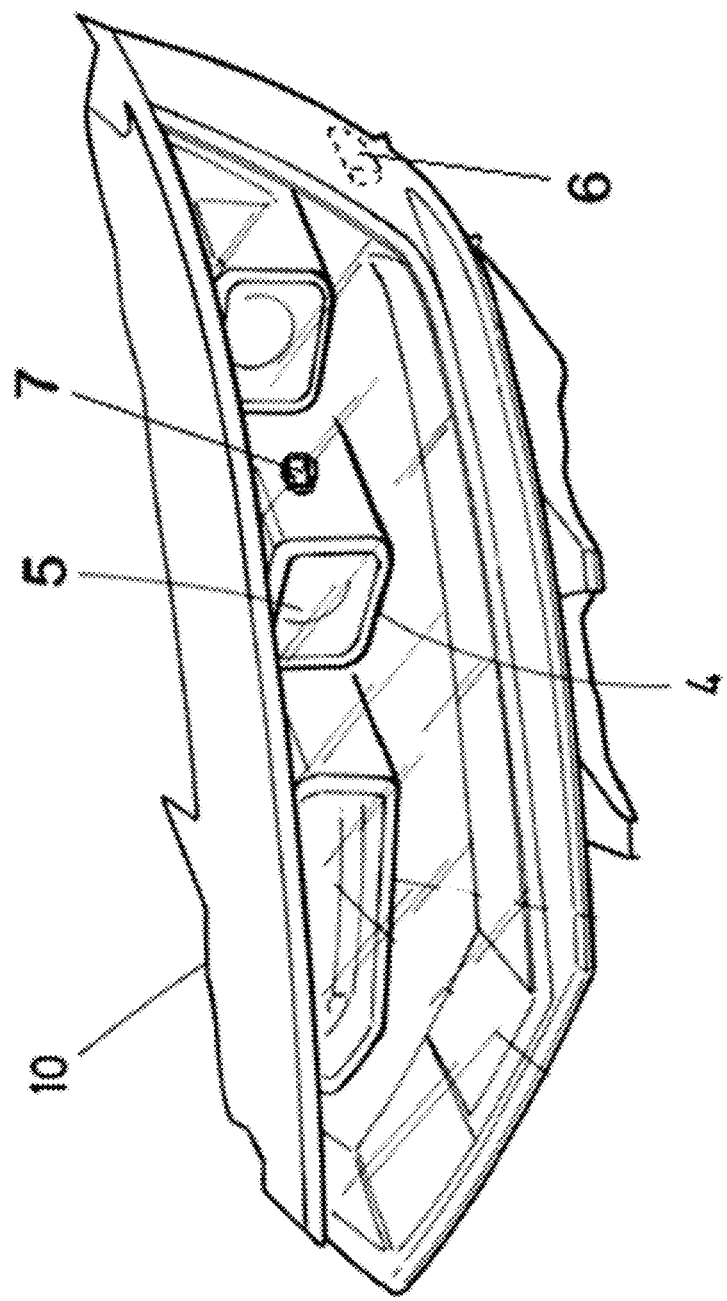
FIG. 5 shows an automotive lighting device according to the invention.

[FIG. 5] shows an automotive lighting device according to the invention, this lighting device comprising:
a light module 4 comprising a plurality of LEDs 5;
a control unit 6 to carry out the compression steps described in the previous figures, generating the compressed data; and
a processor unit 7, the processor unit 7 being configured to decompress the compressed data, this processor unit being located in the light module 4.

This light module would achieve a good quality projection with an improved transmission bandwidth.

The invention claimed is:

1. A method for managing image data for providing a light pattern for lighting or signaling that is output by a light module of an automotive lighting device, the method comprising:
providing an image pattern comprising a plurality of pixels, wherein each pixel is defined by a numeric value related to a luminous intensity of the pixel;
dividing the image pattern in rows or columns of pixels, thus creating a plurality of row patterns;
providing, for each row pattern, a plurality of linear segments, each linear segment providing a linear approximation of luminous intensities of a group of adjacent pixels in the row pattern when the luminous intensity of pixels in the group of adjacent pixels changes across the group of adjacent pixels with an approximately linear slope;

providing, for each row pattern, at least one breaking pixel based on a luminous intensity of the at least one breaking pixel, locating a linear segment comprising the breaking pixel, the linear segment comprising a start pixel and an end pixel;

splitting the linear segment into two linear segments including a first segment from the start pixel to the breaking pixel and a second segment from the breaking pixel to the end pixel;

compressing luminous intensity data of the linear segments after the splitting; and sending the compressed luminous intensity data to the light module.

2. The method according to claim 1, wherein the pixels of the image pattern are greyscale pixels, and a luminous intensity of each pixel is a number according to a scale from 0 to 255.

3. The method according to claim 2, wherein the providing breaking pixels comprises providing more than one breaking pixel for each row pattern.

4. The method according to claim 2, wherein the breaking pixel is located in a segment where the numeric values are higher than a first threshold value.

5. The method according to claim 2, wherein the breaking pixel is located in a segment wherein a difference between the numeric value of a pixel and the numeric value of the adjacent pixel is greater than a second threshold value.

6. The method according to claim 2, wherein the breaking pixel is located in a segment where a difference between the numeric values and the linear approximation is higher than a third threshold value.

7. The method according to claim 2, further comprising decompressing the compressed data.

8. The method according to claim 2, wherein the compressed data is related only to a particular portion of the image pattern.

9. An automotive lighting device comprising:
a light module comprising a plurality of light sources; and
a control unit configured to carry out the method according to claim 2.

10. The automotive lighting device according to claim 8, wherein the light module further comprises a processor unit, the processor unit being configured to decompress the compressed data.

11. The automotive lighting device according to claim 8, wherein the light sources are solid-state light sources.

12. The method according to claim 3, wherein the breaking pixel is located in a segment where the numeric values are higher than a first threshold value.

13. The method according to claim 3, wherein the breaking pixel is located in a segment wherein a difference between the numeric value of a pixel and the numeric value of the adjacent pixel is greater than a second threshold value.

14. The method according to claim 3, wherein the breaking pixel is located in a segment where a difference between the original numeric values and the linear approximation is higher than a third threshold value.

15. The method according to claim 3, further comprising decompressing the compressed data.

16. The method according to claim 3, wherein the compressed data is related only to a particular portion of the image pattern.

17. An automotive lighting device comprising:
a light module comprising a plurality of light sources; and
a control unit configured to carry out the method according to claim 3.

18. The method according to claim 4, wherein the breaking pixel is located in a segment wherein a difference between the numeric value of a pixel and the numeric value of the adjacent pixel is greater than a second threshold value.

19. The method according to claim 4, wherein the breaking pixel is located in a segment where a difference between the original numeric values and the linear approximation is higher than a third threshold value.

20. The method according to claim 4, further comprising decompressing the compressed data.

* * * * *